United States Patent [19]
Seto

[11] Patent Number: 5,363,711
[45] Date of Patent: Nov. 15, 1994

[54] POWER TRANSMISSION DEVICE

[75] Inventor: Norio Seto, Tokyo, Japan

[73] Assignee: Osada Research Institute, Ltd., Tokyo, Japan

[21] Appl. No.: 110,600

[22] Filed: Aug. 23, 1993

Related U.S. Application Data

[60] Continuation-in-part of Ser. No. 25,305, Mar. 2, 1993, Pat. No. 5,301,562, which is a division of Ser. No. 871,421, Apr. 21, 1992, Pat. No. 5,237,884.

[30] Foreign Application Priority Data

| Apr. 22, 1991 | [JP] | Japan | 3-036958 |
| Apr. 22, 1991 | [JP] | Japan | 3-036959 |
| Apr. 26, 1991 | [JP] | Japan | 3-038826 |
| Apr. 26, 1991 | [JP] | Japan | 3-124894 |

[51] Int. Cl.$^5$ .......... F16D 1/10; F16H 21/16
[52] U.S. Cl. .......... 74/25; 30/500; 403/315; 403/322; 464/177; 464/901
[58] Field of Search ...... 74/25; 30/122, 500; 173/29, 217; 403/315, 321, 322, 325; 464/177, 901; 285/86; 279/75, 905

[56] References Cited

U.S. PATENT DOCUMENTS

| 1,346,341 | 7/1920 | Schinkez | 279/75 X |
| 1,868,587 | 7/1932 | Richards | 464/177 |
| 2,278,095 | 3/1942 | Rogers | 464/177 |
| 2,618,940 | 11/1952 | Wyzenbeek | 464/901 X |

FOREIGN PATENT DOCUMENTS

| 813789 | 9/1951 | Germany | 279/75 |
| 1238586 | 7/1971 | United Kingdom | 403/325 |
| 2063991 | 6/1981 | United Kingdom | 403/322 |

*Primary Examiner*—Allan D. Herrmann
*Attorney, Agent, or Firm*—Jordan and Hamburg

[57] ABSTRACT

A power transmission device for connecting a rotation shaft with a mechanism for converting rotational movement into reciprocal movement. The rotation shaft is concentrically accommodated in a rotation shaft sleeve having an outer wall with a circumferential groove. A connecting sleeve, with a plurality of circumferentially arranged through-holes with a ball mounted in each through-hole, slidably receives the rotation shaft sleeve. A sliding sleeve having a circularly formed internal recess is mounted over the connecting sleeve and is slidable to position the balls in the through-holes such as to either connect or disconnect the connecting sleeve from the rotation shaft sleeve.

4 Claims, 5 Drawing Sheets

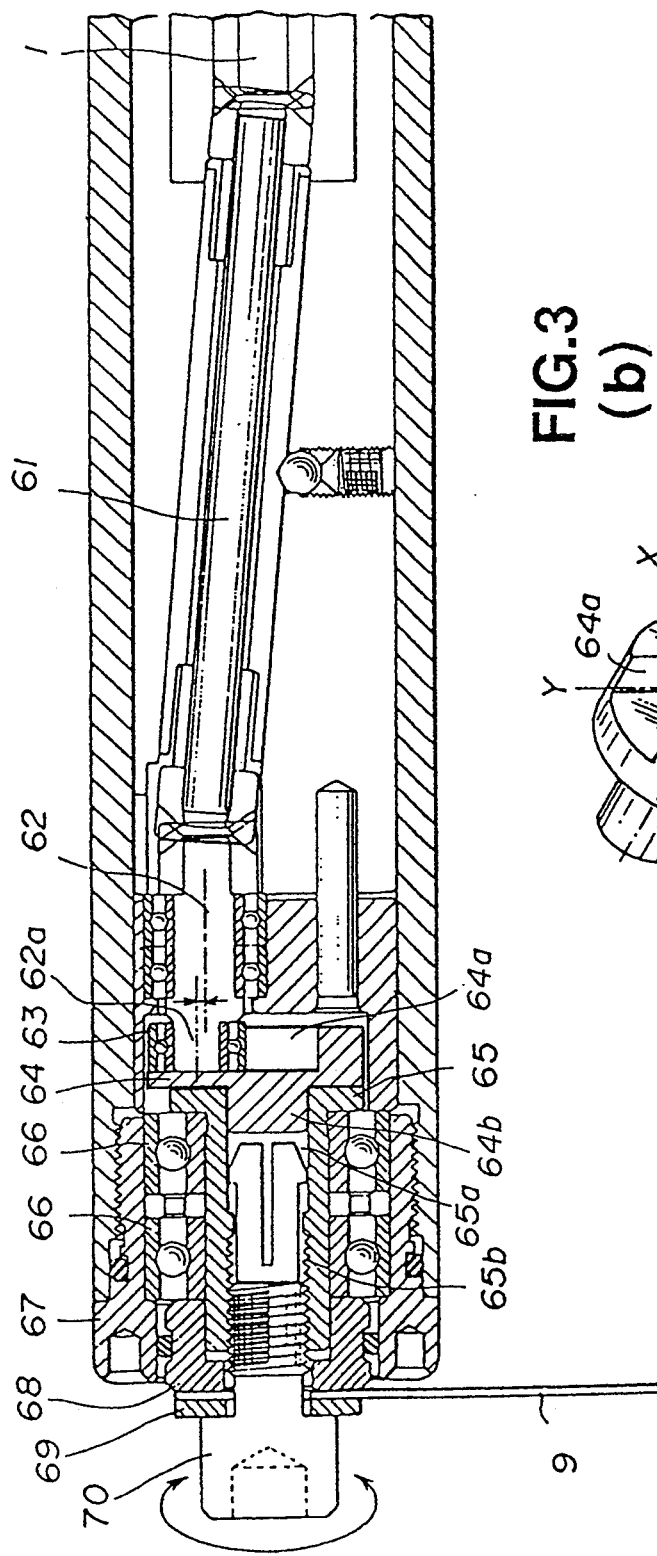
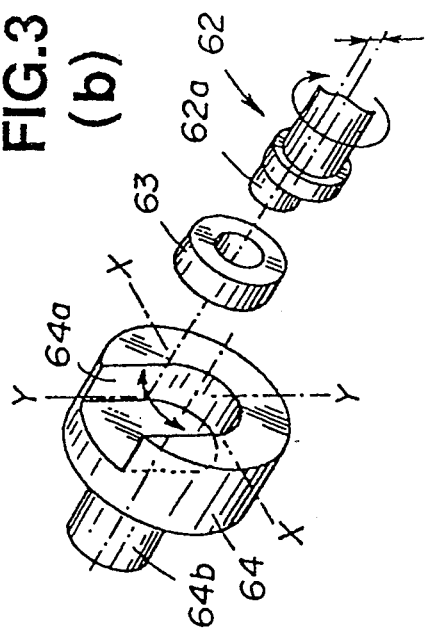

POWER TRANSMISSION DEVICE

This is a continuation-in-part application of Ser. No. 08/025,305 filed Mar. 2, 1993, now U.S. Pat. No. 5,301,562, which is a divisional application of Ser. No. 07/871,421 filed Apr. 21, 1992, now U.S. Pat. No. 5,237,884.

BACKGROUND OF THE INVENTION

The present invention relates to a cutting device which is suitable for cutting and/or amputating fine bones of hands and feet of humans and animals.

In dental treatment, tooth cutting is carried out by using cutting tools to be driven by a micromotor rotating at high speed. In recent years, with the progress of subdivision of medical areas and specialization of medical technology, there have appeared specialists, for example, for the medical treatment of hands or feet only. In medical treatment of hands or feet it is also necessary to carry out operations such as bone amputation or cutting, but no cutting device which is suitable for use in medical treatment of hands or feet, has been developed. Every specialist feels inconvenienced not having it.

SUMMARY OF THE INVENTION

It is the primary object of the present invention to provide a cutting device which is suitable for amputating or cutting fine bones of hands or feet of humans and animals.

It is another object of the present invention to provide a power transmission device which converts rotation of a rotation shaft into reciprocal movement along the axis of the rotation shaft.

It is still another object of the present invention to provide a power transmission device which converts rotation of a rotation shaft into reciprocal turning movement about the same axis as that of the rotation shaft.

It is a further object of the present invention to provide a power transmission device which converts rotation of a rotation shaft into reciprocal turning movement in the direction perpendicular to the axis of the rotation shaft in a plane parallel to the axis of the rotation shaft.

The above-mentioned features and other advantages of the present invention will be apparent from the following detailed description which goes with the accompanying drawings.

BRIEF DESCRIPTION OF THE DRAWINGS

FIGS. 3(a) and 3(b) are views for explaining an embodiment of a power transmission device for converting rotation of a rotation shaft into reciprocal turning movement about the same axis as that of the rotation shaft: FIG. 3(a) is a sectional view and FIG. 3(b) an exploded view in perspective of a part of FIG. 3.

DESCRIPTION OF THE PREFERRED EMBODIMENTS

Figure 1:
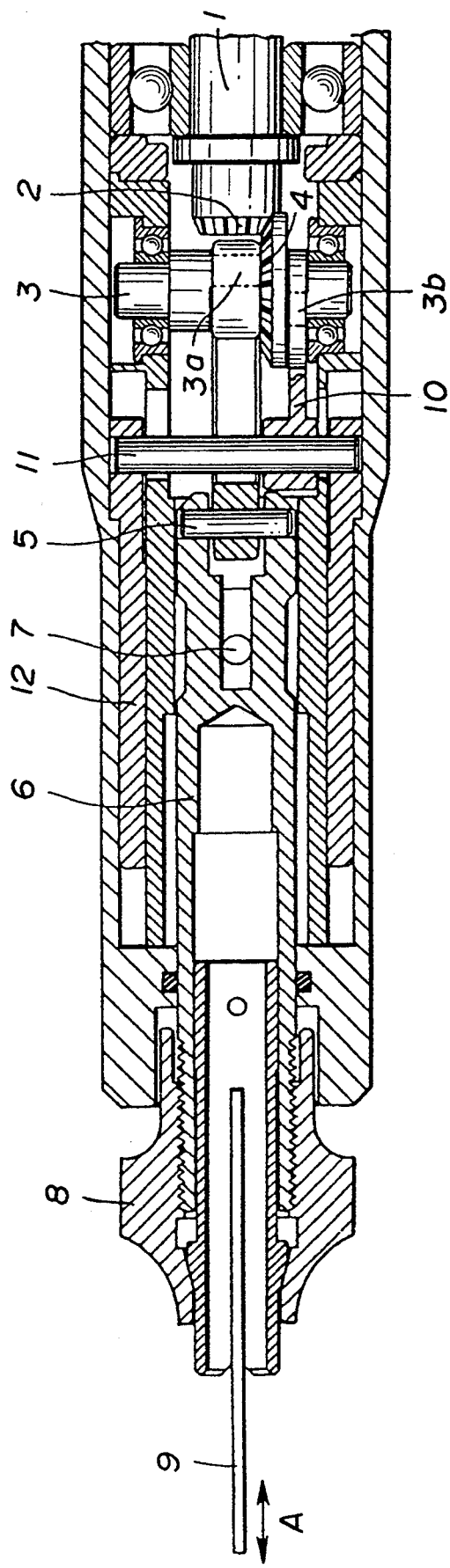
FIG. 1 is a sectional construction view for explaining an embodiment of a power transmission device according to the present invention, which is used for converting rotation of a rotation shaft into reciprocal movement in the axial direction of said rotation shaft.

FIG. 1 is a sectional view for explaining an embodiment of a power transmission device for converting rotational movement of a rotation shaft into reciprocal movement along the rotation shaft's axis. In FIG. 1, numeral 1 denotes a rotation shaft connected to a rotation shaft to be driven by, for example, a micromotor known (not shown) for use in dental treatment, 2 a bevel gear mounted on the top of the rotation shaft 1, 3 a second rotation shaft being rotatable about an axis perpendicular to the axis of the rotation shaft 1 by means of a second bevel gear 4 mounted on the second rotation shaft and meshing with the bevel gear 2. The rotation shaft 3 is provided with two eccentric shafts 3a and 3b arranged at 180° apart from each other about the axis of the rotation shaft 3. A link at its one end engages the eccentric shaft 3a and at its opposite end engages a pin 5 whereto a first-reciprocating member 6 is connected. A guide pin 7 is provided so as to assure smooth movement of the reciprocating member 6. A chucking member 8 threadedly engages the reciprocating member 6. A sawing plate 9 is inserted into the chucking member 8 in a loosened state and is secured to the second reciprocating member 6 by tightening the chucking member 8.

A link 10 engages at its one end with the eccentric shaft 3b and at its opposite end with a pin 11 whereon the second reciprocating member 12 is mounted.

Accordingly, when the rotation shaft 1 rotates, its rotational movement is transmitted to the second rotation shaft 3 through the bevel gears 2 and 4, whereby the eccentric shafts 3a and 3b revolve. The eccentric revolution of the eccentric shaft 3a in the direction perpendicular to the shown section of FIG. 1 is absorbed by the pin 5 and only its reciprocal movement in the lateral direction, i.e. the axial direction of the rotation shaft 1 is transmitted to the first reciprocating member 6, whereby the sawing plate 9 reciprocates along the axis indicate by arrows A to cut a bone or the like by its cutting teeth. At the same time, revolution of the eccentric shaft 3b through the link 10 and the pin 11 is transmitted to the second reciprocating member 12 which reciprocally moves along the same axis but in the opposite direction in relation to the reciprocating member 6 because the eccentric shafts 3a and 3b are located 180° apart in relation to the axis of rotation shaft 3. Namely, while the first reciprocating member 6 moves to the left (or the right), the second reciprocating member 12 moves to the right (or the left). The second reciprocating member 12 acts as a damping member for the first reciprocating member 6. In other words, it serves as a balancer of the rotating shaft 3, which makes rotation of the shaft 3 stabilized so as to ensure smooth reciprocation of the sawing plate 9.

As apparent from the foregoing description, according to the present invention it is possible to provide the power transmission device which is capable of converting rotational movement of a rotation shaft into reciprocal movement along the axis of the rotation shaft, assuring more smooth reciprocation.

However, since the above-mentioned cutting tool is of such a type which moves reciprocally in the direction indicated by arrows A and the rotation shaft 1 is coupled with a conventional handpiece for use in dental treatment, it is feared that the reciprocating portion may be disconnected from the rotation shaft portion during operation of the device.

Figure 2:
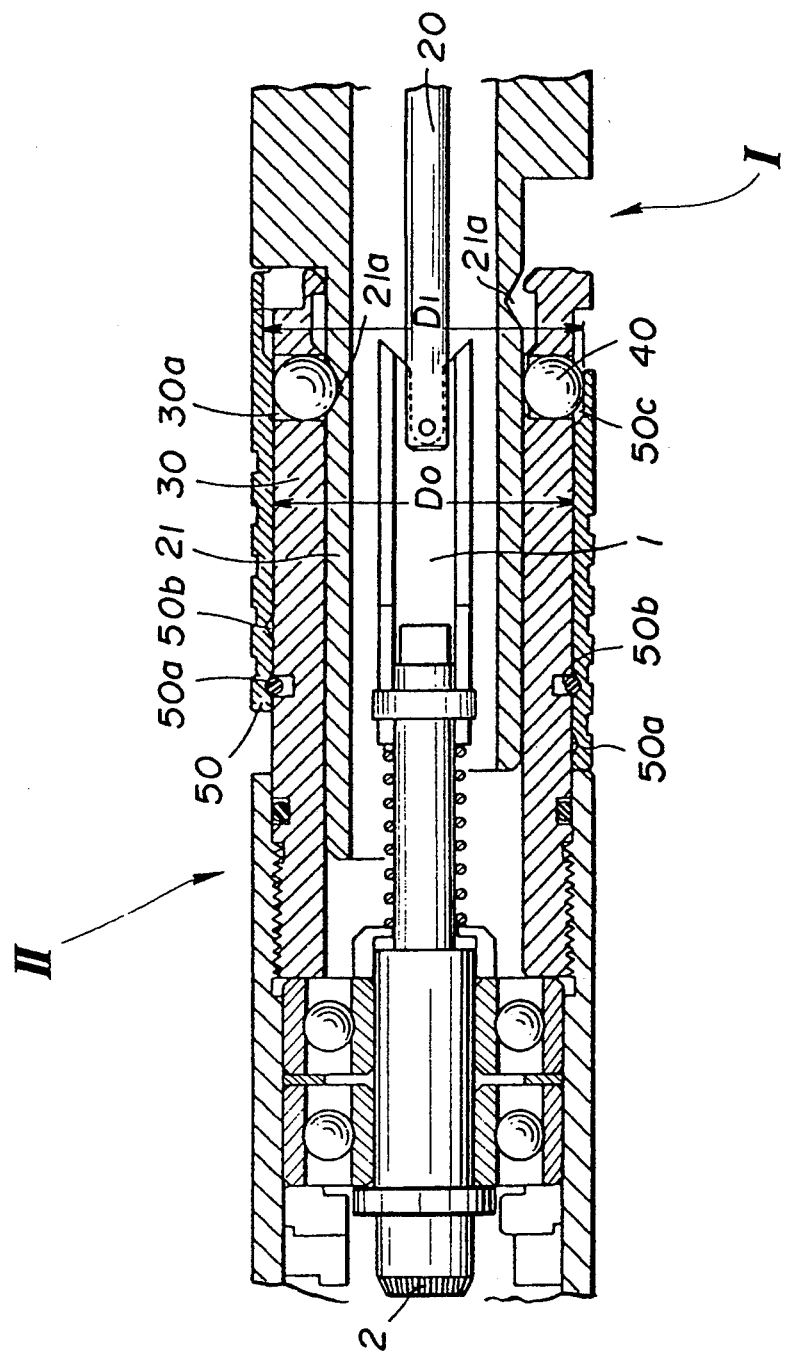
FIG. 2 is a view for explaining an embodiment of a power transmission device for converting rotation of a rotation shaft into reciprocal movement in the axial direction of the rotating shaft, wherein the rotating portion and the reciprocating portion are steadily coupled with each other so that the latter may not slip out from the former.

FIG. 2 is a sectional view for explaining an embodiment of a connecting portion of the device, by which the above-mentioned problem was solved. In FIG. 2, a rotation shaft side and reciprocating portion side are indicated by numerals I and II respectively. A rotation shaft 20 in a dental handpiece is driven by a micromotor (not shown) mounted in a power section and located in a center of a sleeve 21 having a peripheral groove 21a formed externally thereon. A mechanism for converting rotational movement of the rotation shaft 20 into the reciprocal movement in the axial direction of the shaft 20 comprises a connecting sleeve 30 that accommodates therein the rotation shaft 1 connected at its one end to the rotation shaft 20 and has a plurality of through holes 30a arranged in the circumferential direction thereof. The sleeve 21 is slidably inserted in the axial direction in the connecting sleeve 30. A ball 40 is placed in each through-hole 30a of the connecting sleeve 30. The connecting sleeve 30 is accommodated in a sliding sleeve 50 which is slidable in its axial direction along the external surface of the connecting sleeve 30 and can be located at any of two positions 50a and 50b. This sliding sleeve 50 has an internally concaved portion 50c having an inner diameter D1 larger than an outer diameter DO of the connecting sleeve 30. The sliding sleeve 50 is positioned at the first fixing position 50b (see the lower half of FIG. 2) with a concaved portion 50c placed opposite to the balls 40 (see the lower half of FIG. 2), and the sleeve 21 is inserted into the connecting sleeve 30 in such a way that the balls 40 are fitted in the circular groove 21a of the sleeve 21 (see the upper half of FIG. 2). Then, the sliding sleeve 50 is located at the second fixing position 50a in such a way that the ball 40 is placed in the circular groove 21a under the pressure of the inner wall surface of the sliding sleeve 50 (see the upper half of FIG. 2). This eliminates the possibility of disconnection of the connecting sleeve 30 from the sleeve 21.

As mentioned above, in this embodiment the rotation shaft portion I and reciprocating portion II are securely connected with each other by means of the balls 40 and the sliding sleeve 50 so as not to cause the reciprocating portion II to slip off from the rotor shaft portion I during operation of the device for converting the rotational movement of the rotation shaft 20 into reciprocal movement along the axis of the rotor shaft 20.

FIGS. 3(a) and 3(b) are views of a principal part of a power transmission device embodying the present invention, which is capable of converting rotational movement of a rotation shaft into reciprocal turning movement about the same axis as that of the rotator shaft. In FIG. 3(a), numeral 1 designates a rotation shaft to be connected to a rotation shaft driven by, for example, a micromotor for use in dental treatment.

Rotation of the rotation shaft 1 is transmitted through inclined rotation transmitting device 61 to a second rotation shaft 62 eccentrically positioned in relation to the rotation shaft 1. This rotation shaft 62 at its front end has a bearing 63 which rotates with an eccentricity to the second rotation shaft 62 as shown in FIG. 3(b) and causes rocking of a rockable member 64 which at its side opposite to the bearing 63 has a concaved portion 64a having the same width in the X—X direction as the diameter of the bearing 63 and of the width in the Y—Y direction larger than the maximum eccentricity of the bearing 63. The bearing 63 is fitted in the concaved portion 64a. Accordingly, when the second rotation shaft 62 rotates, the rockable member 64 reciprocally revolves about the axis 64b in the X—X direction. The rockable member 64 is supported by supporting member 65, for example, as fitted in a hollow hole 65a thereof. The supporting member 65 is rotatably mounted in a fixing member 67 by means of a bearing 66.

In FIG. 3(a), 68 is a bearing fixing side member, 69 is a washer, 70 is a fixing bolt and 9 is a sawing plate. The supporting member 65 has the hollow hole 65a with a thread 65b for threadedly engaging fixing bolt 70. The sawing plate 9 can be secured at its end between the bearing fixing member 68 and the washer 69 by tightening the bolt 70. While the rotation shaft 1 rotates, the sawing plate 9 together with the supporting member 65 reciprocally moves in the direction perpendicular to the section shown in FIG. 3.

As is apparent from the foregoing description, the preferred embodiment makes it possible to transmit rotation of the rotation shaft 1 to the coaxially therewith mounted rotary supporting member 65 which in turn coaxially and reciprocally moves. Accordingly, when the sawing plate 9 having cutting teeth is secured to the rotary supporting member 65 of the device, the sawing blade can reciprocally move at a high speed so as to easily cut bones and the like.

Figure 4:
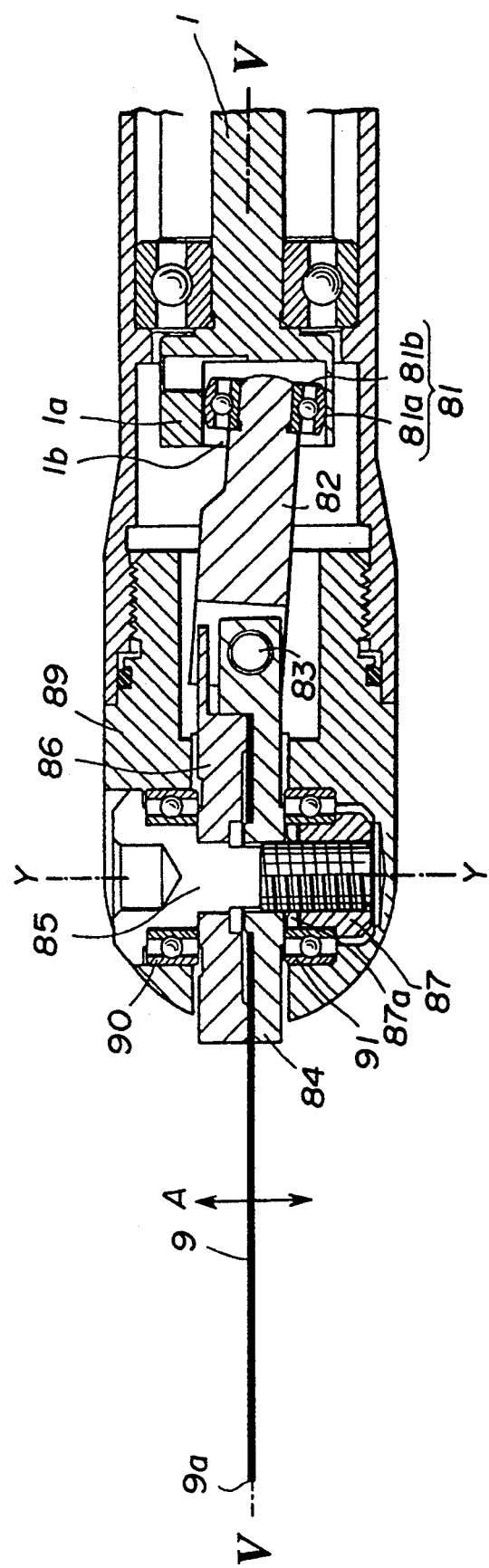
FIG. 4 is a view for explaining an embodiment of a power transmission device for converting rotation of a rotation shaft into reciprocal turning movement in the direction perpendicular to the axis of the rotation shaft in a plane parallel thereto.
Figure 5:
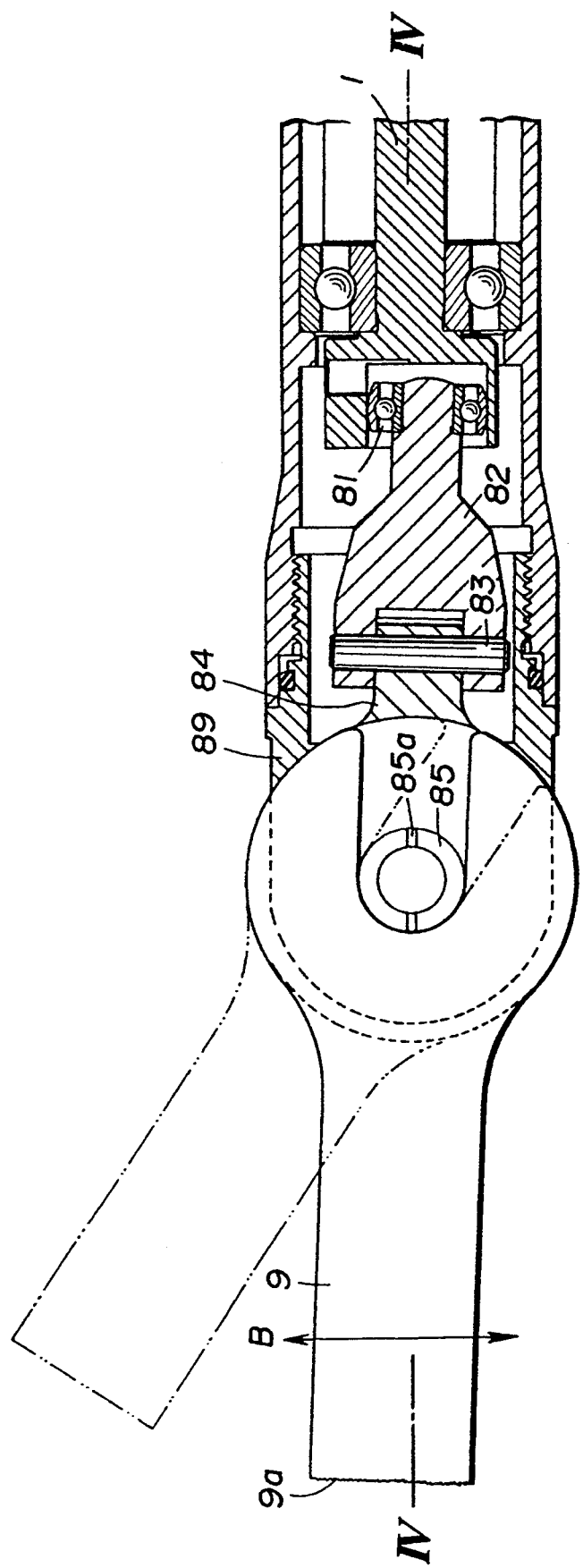
FIG. 5 is a sectional view taken on line V—V of FIG. 4.

FIG. 4 is a sectional construction view (a section taken on line IV—IV of FIG. 5) of the principal part of an embodiment of the power transmission device for converting rotational movement of a rotation shaft effectively into reciprocal turning movement in the direction perpendicular to the axis of the rotation shaft in a plane parallel thereto, and FIG. 5 is a section taken on line V—V of FIG. 4, wherein numeral 1 designates a rotation shaft adapted to be connected with a rotation shaft driven by a conventional micromotor, for example, for use in dental treatment.

Rotation shaft 1 has a recess 1b eccentrically formed in its top end 1a, wherein a single-shielded bearing 81 is rockably fitted at its outer race 81a and has a link 82 secured in its inner race 81b. When the rotation shaft 1 rotates, the recessed potion 1b eccentrically revolves to spin the link 82 being supported at its end in inner race 81b of the bearing 81. The link 82 is connected at its other end with a pin 83 to a rotatable plate 84 which is connected to a rotatable rod 85 in such a way to be rotated as one unit. A pressure plate 86 is connected to the top end of the link 82 so as to be rockable as one unit. 87 is a fixing nut and 9 is a sawing plate having cutting teeth 9a at its top end. The rotatable rod 85 has a driver groove 85a formed in its head for turning the rotatable rod 85 and has a lower portion threaded for engaging the fixing nut 87 which can be firmly locked with its projection 87a fitted in a groove formed at the lower portion of rotatable plate 84. When the rotatable rod 85 is turned in the tightening direction by using, e.g. a coin inserted in the groove 85a of the rod 85, the rod 85 moves the fixing nut 87 upward to clamp the sawing plate 9 between the rotatable plate 84 and the pressure plate 86. When the rotatable rod 85 is turned in the opposite direction, a gap between the rotatable plate 84 and the pressure plate 86 is widened to allow removal of the sawing plate 9.

In the embodiment described above, the rotating shaft 1, the pin 83 and the rotatable rod 85 have their axes at right angles to each other, so that the rockable plate 84 is prevented from moving upward and downward (in direction A of FIG. 4) by the rotatable rod 85 and movement in this direction (A) can be absorbed by the eccentric movement of the link 82 which is pivotally connected to the rotatable plate 84 with the pin 83.

Movement in the direction perpendicular to the section of FIG. 4, i.e. in direction B shown in FIG. 5, can not be absorbed by the pin 83 and be fully transmitted to the rotatable plate 84. However, the rotatable plate 84 rotates in ball bearings 90 and 91 together with rotatable rod 85 in a supporting portion 89, whereby the sawing plate 9 rotates about the rotatable rod 85. It will therefore be appreciated that, although there is oscillatory movement of plate 84 about the axis of rotatable rod 85, such oscillatory movement consists primarily of a component of such movement in the direction of arrow B in FIG. 5, with an additional minor component of such movement in the horizontal direction of FIG. 5, that is, parallel to the axis of shaft 1. Thus, an effectively reciprocatory movement is obtained, which is perpendicular to the axis of pin 83 and perpendicular to the axis of shaft 1.

As is apparent from the foregoing, in the embodiment described it is possible to convert rotational movement of the rotation shaft effectively into reciprocal movement in a direction perpendicular to the rotation shaft axis and in a plane parallel to or containing the rotation shaft axis. Consequently, by using the device in which a plate having cutting teeth at its top end is mounted, it is possible to cut or cut off a bone or the like with the cutting plate by moving the device as if a vertical line is drawn with a pencil. The cutting plate 9 can be mounted in the device at a desired angle as shown in FIG. 5.

I claim:

1. A power transmission device for connection of a rotation shaft with a mechanism for converting rotational movement of the rotation shaft into reciprocal movement in an axial direction of the rotation shaft, the rotation shaft being concentrically accommodated in a rotation shaft sleeve having an outer wall with a groove circumferentially formed therein, said device comprising:

a connecting sleeve for slidably receiving the rotation shaft sleeve therein, said connecting sleeve including a wall having a plurality of through-holes extending therethrough and circumferentially arranged therearound;

a ball mounted in each of said through-hole;

a sliding sleeve mounted over the connecting sleeve and having a circularly formed internal recess of an inner diameter larger than an outer diameter of the connecting sleeve, the sliding sleeve being freely slidable without any external biasing force thereon in an axial direction thereof with respect to said connecting sleeve between a first position with the balls placed in the recess and the rotation shaft sleeve inserted in the connecting sleeve and a second position having an inner wall thereof pressing the balls in the circumferential groove of the rotation shaft sleeve so as to prevent disconnection of the connecting sleeve from the rotation shaft sleeve without any said external biasing force on said sliding sleeve.

2. A power transmission device according to claim 1, wherein said inner wall of said sliding sleeve has a substantially constant inner diameter.

3. A power transmission device according to claim 2, wherein said inner wall of said sliding sleeve lies substantially flush against an outer surface of said connecting sleeve.

4. A power transmission device according to claim 1, wherein said circularly formed internal recess is formed at an end of said sliding sleeve.

* * * * *